Jan. 7, 1969   B. HAMMARLUND   3,421,052
DEVICE FOR INDICATING FAULTS IN DIFFERENT PARTS OF A DIRECT
CURRENT NETWORK, WHICH PARTS ARE CONNECTED TO EACH OTHER
Filed Oct. 13, 1965                              Sheet 1 of 2

INVENTOR.
BERTIL HAMMARLUND
BY
Bailey, Stephens + Huettig
Attorneys

INVENTOR.
BERTIL HAMMARLUND
BY
Bailey, Stephens + Huettig
Attorneys

United States Patent Office 3,421,052
Patented Jan. 7, 1969

3,421,052
DEVICE FOR INDICATING FAULTS IN DIFFERENT PARTS OF A DIRECT CURRENT NETWORK, WHICH PARTS ARE CONNECTED TO EACH OTHER
Bertil Hammarlund, Ludvika, Sweden, assignor to Allmänna Svenska Elektriska Aktiebolaget, Vasteras, Sweden, a Swedish corporation
Filed Oct. 13, 1965, Ser. No. 495,381
Claims priority, application Sweden, Dec. 19, 1964, 15,425/64
U.S. Cl. 317—26                 6 Claims
Int. Cl. H02h 3/28

ABSTRACT OF THE DISCLOSURE

In a D.C. network comprising two or more parts, selective fault indicating means comprising one or more current deriving means are inserted in the network. Said current deriving means are responsive to discharge currents between the different parts of the network in case of a fault in a part of the network. Each of said current deriving means has one or two output signal means responsive to the polarity of the network and of the derived direct current and thus to the direction of said discharge currents.

---

Figure 1:
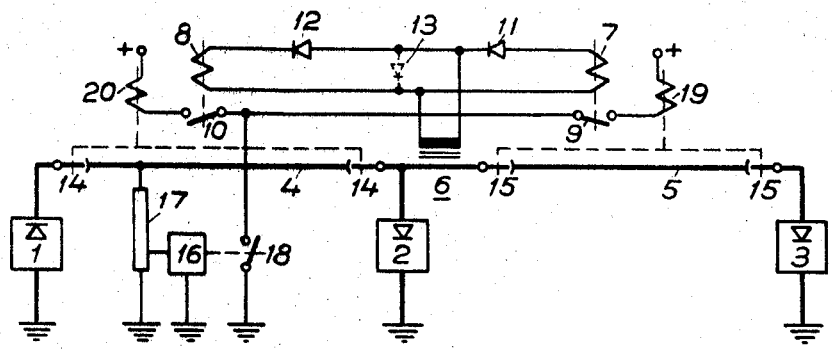

The present invention relates to a method for selective fault indication in a D.C. network and apparatus for selective fault indication according to this method.

Power transmissions with high voltage direct current known up to now have been made to connect two stations, so that a line protection device for such a transmission preferably has comprised fault indication members which for example are based on the measurement of the line voltage and suitable operating means, for example intended to influence the control systems in the converter stations at the ends of the transmission.

When connecting more than two converter stations are connected with a D.C. network which thereby is built up as a branched or meshed network, there is a demand in such a network for selective fault indication in order in a given case to be able to disconnect those parts of the network in which a fault has occurred so that the rest of the network may continue its undisturbed operation.

According to the present invention it is proposed to build up such a selective fault indication from the fact that each pole of a D.C. network during operation assumes a certain direct voltage potential, so that a fault, for example an earth fault, gives rise to a capacitive discharge current from the different parts of the network to the fault point. A selective fault indication according to the invention is characterized in that the direction of the capacitive discharge current occurring upon the occurrence of faults in one pole of the network is indicated at suitable points of the network, and that the result of said indication is analysed according to predetermined directives. The possibility of this principle depends on the fact that it is very simple in a given network to predetermine the direction of the discharge currents occurring when faults arise in different parts of the network and it is possible therefore according to the invention to chose suitable points in the network where the direction of these discharge currents is indicated. Further, the direction of said discharge currents in the different points is wholly independent of the line voltage as well as the size and direction of the normal load current in the different parts of the network.

The means for selective fault indication according to the invention will therefore be based on members which are sensitive to the direction of said discharge currents. As suitable members, impulse transformers can for example be feasible, the primary side of which is connected into the network at the desired points while the secondary side will operate as a signal means. In order to be able to indicate the direction of said discharge currents, the secondary side of the impulse transformers must therefore be connected to suitable members, for example a diode connection, for separating the input voltages from the impulse transformer with different polarity. In order to avoid saturation in the core of such an impulse transformer, this should suitably be made as an air gap core. As another possible indicating member, a Hall generator can for example be feasible, whose magnet field is supplied by the current in the D.C. network. Transductors could also be used for said purpose.

An example of a very simple D.C. network is a D.C. network divided up into two parts connected together at one point, so that apparatus according to the invention can consist of a single indicating member connected between the two network parts. A discharge current in one direction will hereby correspond to faults in one network part, while a discharge current in the opposite direction corresponds to faults in the other part of the network. With more complicated networks, for example branches or meshed networks, a larger number of indicating members must be arranged at suitable points in the network and the different members must be connected to a common indication system for the analysis of the incoming signals.

The invention will be described more closely with reference to the accompanying drawing, where the different figures show examples of selective fault indication means according to the invention for different D.C. networks.

FIGURE 1 shows three converter stations 1, 2 and 3, whose positive poles are connected together to a rectifier 4, 5, while the negative poles are connected to earth. The positive pole of the D.C. network will thus in this case consist of two parts 4 and 5 connected at the station 2. If at this connection point an impulse transformer 6 is arranged, it is possible by means of this to indicate the direction of a discharge current from one network part to the other. It is seen that with positive polarity on the network a fault in one network part will cause a discharge current from the other network part, while with negative polarity the discharge current will go from the point of the fault to the other network part. The said discharge current has the characteristic of a current pulse which induces in the secondary side of the impulse transformer a voltage pulse, whose polarity corresponds to the direction of the discharge current. It is thus the polarity of said voltage pulse which indicates in which part of the network a fault has occurred, so that the secondary side of the impulse transformer 6 can suitably be connected to two relays 7 and 8 with corresponding contacts 9 and 10 respectively over diodes 11 and 12 respectively. The two parts of the D.C. network can suitably be provided with disconnecting means in the form of isolator switches 14 and 15 respectively controlled from a line protection device 16 of known type, which line protection device indicates by means of a potentiometeter 17 the transmission voltage. The line protection device 16 is for example intended to co-operate with the control system of the converter stations so that upon the occurrence of a line fault the transmission voltage is decreased to zero in order to make the point of the fault currentless. In the same way as in the A.C. network, a suitable number of reconnections is made and if these give a negative result an order of definite disconnection is given. This order can for example delivered by telecommunications to the isolating switches in the two network parts 4 and 5 in combination with the order given from the impulse transformer across one of the contacts 9 or 10 to the faulty part of the network. In this way the faulty network part indicated by the indication device is disconnected, after which the fault-free part of the network can go back to normal voltage.

If in the case shown the station 1 is a rectifier station while the stations 2 and 3 are inverter stations fed from the station 1, it is seen that when a permanent fault occurs in the line part 5 a disconnection of this line part makes it possible for the stations 1 and 2 to continue their normal operation. If, in the other hand, a fault occurs on the network part 4, the whole transmission must be disconnected. In this case the relay 8 becomes superfluous so that it can be short circuited by a diode 13. A signal from the relay 7, 9 will thus correspond to a fault in the line part 5, so that this line part will be disconnected by opening the isolating switches 15 if the line protection device also indicates that a permanent earth fault exists in the transmission line. If, however, a fault is indicated by the line protection device 16, but no signal is obtained from the impulse transformer 6, this means that the fault has occurred in the line part 4, so that the whole transmission line must be made currentless. With other power direction conditions, for example if the stations 1 and 3 are rectifiers and station 2 is an inverter, the relay 8 and the corresponding isolating switch will again be important.

Figure 2:
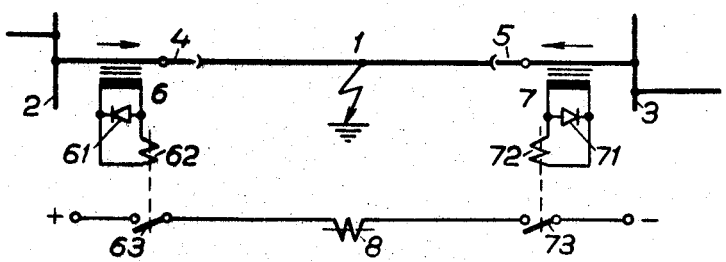

FIGURE 2 shows another fault indication means for a part of a D.C. network 1, other parts of the D.C. network being connected to its end points 2 and 3. At the ends of the line part impulse transformers 6 and 7 have been connected. Upon a fault on the line part 1 the discharge currents caused thereby will be in the opposite direction to each other, as is shown in by the arrows at the ends of the line. If on the other hand a fault occurs in the D.C. network outside said part, the discharge currents at the ends of the part 1 will having the same direction. By suitable connection of the secondary sides of the impulse transformers 6 and 7, the voltage pulses from the impulse transformers will therefore co-operate upon the occurrence of a fault within the network part 1. This co-operation can be produced as shown on the drawing where diodes 61, 71 and relays 62, 72 with accompanying contacts 63, 73, respectively are connected to the secondary sides of each impulse transformer. Upon a fault within the line part 1, the two relays 62 and 72 will operate so that the relay 8 receives voltage and opens the switches 4 and 5, while upon a fault outside said line part the output signal from one of the impulse transformers will have such a direction that it is shortcircuited by the corresponding diode, so that only one of the relays operates.

Figure 3:
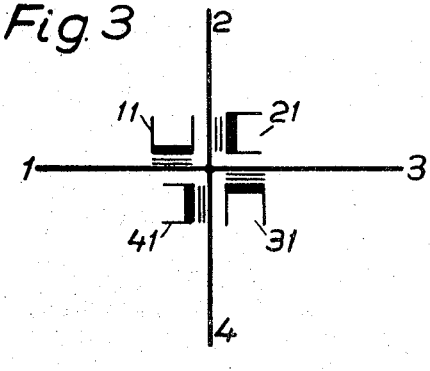

FIGURE 3 shows four D.C. lines 1-4 connected in a branch point. In each line an impulse transformer 11-41 according to the invention is inserted. If the four lines have negative potential a fault in one line will give a discharge current pulse in that line with a direction towards the branch point shown, while the discharge current pulses in the remaining lines will have a direction away from the branch point. The different impulse transformers can therefore on their secondary sides be provided with a diode connection, corresponding to the diodes 61 and 71 in FIGURE 2, whereby voltage pulses induced by discharge currents with a direction towards the branch point are led to a signal transmitter, while voltage pulses corresponding to discharge current pulses with a direction away from the branch point are short circuited.

With more complicated D.C. networks, such as meshed or branched networks the direction of the discharge currents at different points in the network can be indicated according to one or several of the above stated principles. The signals from the different parts of the network can then be connected to a common centre to which the signal from a line protection device for the complete network can also be connected. By co-ordinating the received signals in such a centre, it is possible to give orders for disconnection of the part or parts of the network where faults have occurred. The transmission of the signals to and from the centre must be made by suitable telecommunication links.

Figure 4:
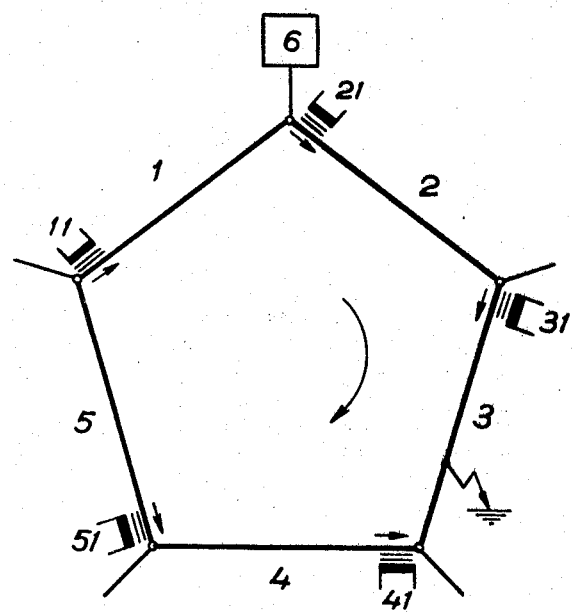

FIGURE 4 shows for example a meshed network consisting of five parts 1–5 connected in polygon connection. Near the corner points of the polygon connection, indication devices 11–51 according to the invention are connected. These indication devices are provided on the output side with diode connections corresponding to the diodes 11 and 13 in FIGURE 1. These connections are so arranged that a certain direction of circulation for a discharge current in the polygon connection is produced, so that the discharge currents in one direction will give signals in the proper indication device, while the signals occurring upon discharge currents in the opposite direction will be short circuited.

Figure 5:
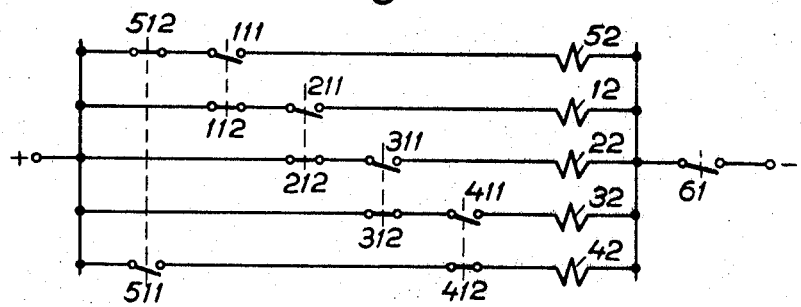

In FIGURE 5 a central operating device is shown, controlled both by means of signals from the indication devices 11–51 and by means of a non-selective line protection device 6 for the complete network which influences a contact 61 in the central system in FIGURE 5. In the system are relay coils 12–52 for release devices for the different line parts 1–5 respectively. Further, the indication devices 11–51 control the relays, each with two contacts 111, 112, etc. connected in series to the relay coils 12–52. In FIGURE 4 a direction of circulation for the ring network has been shown and the indication devices 11–51 are made so that discharge currents in accordance with said direction of circulation do not give any signal, while discharge currents opposite to this direction give a signal to the respective relays which thereby switch the proper contacts 111, 112, etc. If there is a fault in the line part 3, the discharge current pulses in the indication devices 11, 21 and 31 will agree with the direction of circulation, so that no signals will be emitted from these devices. This means that the contacts 111, 112, 211, 212, 311 and 312 will remain unaffected. The discharge currents on the devices 41 and 51 will however be opposite to the direction of circulation so that the contacts 411, 412, 511 and 512 will be switched. This means that the relay coil 32 and only this coil will receive voltage when the contact 61 is closed by the common line protection device 6, so that the line part 3 will be disconnected from the ring network.

If the part of the ring network which lies diametrically opposite the fault position, i.e. the part of the ring network which lies between the devices 11 and 51, has a small capacitance, the discharge current pulses in the last mentioned two indication devices will be quite weak and possibly of an indefinite direction. This is however unimportant. As mentioned previously, the device 11 will not even give any signal at all, while a lack of signal from the device 51 means that the contacts 511 and 512 maintain their shown positions, which is also unimportant for the working of the device. It is seen that the principle according to FIGURES 4 and 5 is that the last line part in the chosen direction of circulation whose indicator does not give a signal is regarded as the faulty line part.

What is claimed is:

1. In a D.C. network comprising at least two line parts; said line parts being connected in a common point; means for selective fault indication in said line parts comprising means associated with said line parts in the vicinity of said common point and responsive to the flow of current between said parts to derive from said line parts a direct current, the direction of which is dependent on the occurrence of a fault in one or the other of such parts, at least one signal means for each of said line parts, and unidirectional connecting means between said current deriving means and each said signal means, said unidirectional connecting means to one of said signal means conducting derived direct current flowing in one direction and to the other signal means conducting derived direct current flowing in the other direction.

2. In a D.C. network as claimed in claim 1, a rectifier station at the outer end of one of said line parts feeding said network with D.C. power; said current direction means giving an output signal only in response to a discharge current pulse produced by a fault in the line part lying furthest away from said feeding rectifier station.

3. In a D.C. network as claimed in claim 1, said network comprising more than two line parts; one of said line parts being connected to other line part at two different points; said current deriving means comprising for said line parts two means sensitive to the direction of discharge current pulses in said line part; said two sensitive means being located in the vicinity of said two connection points of the line part; combining means for the output signal in response to signals from said two sensitive means corresponding to counter-directed discharge current pulses at said two connection points.

4. In a D.C. network as claimed in claim 1, said network comprising several line parts connected at a common star point; said current deriving means comprising for each line part means sensitive to discharge current pulses in said line part; said sensitive means being connected to said line part near said common point of the line parts; said sensitive means giving an output signal only in a response to a discharge current pulse which is counter directed to the discharge current pulses in all the other line parts; the direction of said discharge current pulses in all the line parts being considered in relation to said common point.

5. In a D.C. network as claimed in claim 1, said network comprising several line parts connected in a polygon connection, said current deriving means comprising for each corner of said polygon connection an indicating means sensitive to discharge current pulses in said polygon connection, said sensitive means giving an output signal only in a response to discharge current pulse with a direction corresponding to a predetermined direction of circulation in said polygon connection, combining means for all said sensitive means, said combining means having a circuit for each pair of adjacent sensitive means, such circuit giving an output signal in response to a signal from only one of the corresponding two sensitive means, said sensitive means causing said output signal having a predetermined position in said direction of circulation in relation to the other of said two sensitive means.

6. In a D.C. network as claimed in claim 1, a non-selective fault indicating means for said network, combining means for all of said signal means, switching means for disconnection of said different line parts, said switching means being controlled by said combining means and said non-selective fault indicating means, said switching means for each line part including means to disconnect said line part from the network in response to a control signal from both said combining means and said non-selective means.

References Cited
UNITED STATES PATENTS

| | | | |
|---|---|---|---|
| 2,677,092 | 4/1954 | Schmidt | 317—26 |
| 2,717,318 | 9/1955 | Keith et al. | 317—26 |
| 3,144,585 | 11/1964 | Blakemore | 317—28 |
| 3,222,575 | 12/1965 | Dexter | 317—46 |
| 3,259,802 | 7/1966 | Steen | 317—18 |
| 3,323,018 | 5/1967 | Roth | 317—28 |
| 3,337,774 | 8/1967 | Rockefeller | 317—46 |
| 3,309,572 | 3/1967 | Riebs | 317—26 |

JOHN F. COUCH, *Primary Examiner.*

R. V. LUPO, *Assistant Examiner.*

U.S. Cl X.R.

317—27, 28, 46